April 23, 1929.  L. G. COPEMAN  1,710,405

REFRIGERATING CABINET

Filed Feb. 15, 1926

INVENTOR.
Lloyd G. Copeman
BY
Stuart C. Barnes
ATTORNEY.

Patented Apr. 23, 1929.

1,710,405

UNITED STATES PATENT OFFICE.

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN.

REFRIGERATING CABINET.

Application filed February 15, 1926. Serial No. 88,341.

This invention relates to ice cream or similar cabinets. It is the object of the invention to provide a construction which eliminates the formation of ice on the cover, or throat of the container. Power refrigeration is rapidly coming into general use for ice cream cabinets, and one of the great annoyances in this type of cooler is the collection of ice either on the cover itself or else on the throat that leads into the container. This results in keeping the cover spaced from the container, permitting air to get into the container and greatly impairing its efficiency.

It is the object of my invention to do away with this annoyance.

Figure 1:
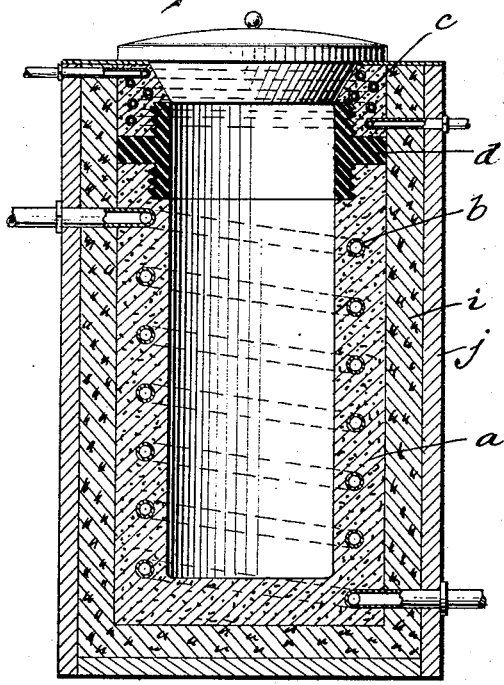
Fig. 1 is a vertical cross section of a refrigerating cabinet equipped with my new invention.
Figure 2:
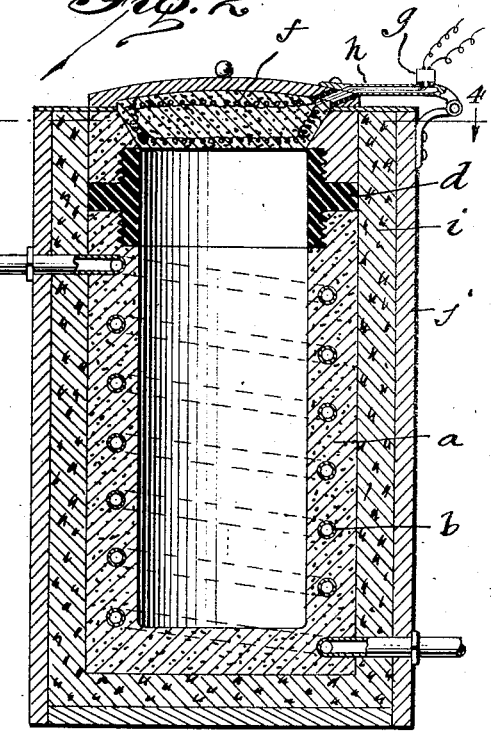
Fig. 2 is a similar view of a modified form of the invention.
Figures 3, 4:
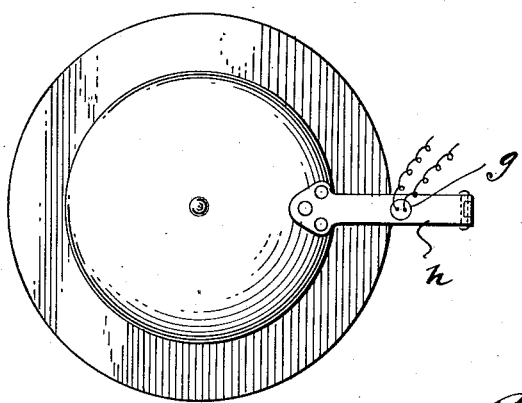
Fig. 3 is a plan view of the modification shown in Fig. 2.
Fig. 4 is a cross section taken on the line 4—4 of Fig. 2.

I preferably construct the container itself of stone. This is a special form of oxychloride cement, which I have disclosed in some of my prior applications, and which contains magnesium oxide, a suitable aggregate such as ground flint or sand, and to which dry mix is added enough magnesium chloride in solution at 26° Baumé, to make a mix which will either pour or can be tamped together, just as desired. This is simply illustrative and it is unnecessary to give the exact proportions as these may vary with the character of the work desired. This container, which is designated $a$, is molded about a coil $b$, which carries the usual expanding gases of a power refrigerating system, such as sulphur dioxide, butane, or some of the other volatile substances used for this purpose. There is also molded into the container a bushing of heat-insulating material designated $d$, and which may be wood, bakelite, or any other suitable substance. This cuts off the lower part of the container from the upper part and above the heat-insulating medium in the upper part of the container, as is shown in Fig. 1, is incorporated a heating element designated $c$, which may be either water or steam pipes, as shown, or any other heating element. This can be regulated to supply just enough heat to keep the top of the container and the cover from being coated with ice or any other frozen material. In the modification shown in Figs. 2, 3 and 4, the heating element is in the form of a coil $f$, which may be nickel chromium wire to provide the usual electric heating element. This is preferably supplied with current through the removable plug $g$, placed on the hinge arm $h$, on which the cover turns.

It will be obvious that the heating element may be placed either in the cover itself, or in the neck of the container as shown in Fig. 1. The stone container is surrounded by insulating material, preferably cork board $i$, which is contained in the wooden cabinet $j$.

What I claim is:

1. In a refrigerating cabinet, the combination of a container in the form of a single chamber, means for abstracting heat from the lower portion of the chamber, and means for preventing the formation of ice and frost on the upper part of the container.

2. In a refrigerating cabinet, the combination of a container, means for abstracting heat from the lower part of the container, means for transferring heat to the upper part of the container, and heat-insulating means between the two.

3. In a refrigerating cabinet, the combination of a container of stone, an expansion coil for keeping the lower part of the container cool, and a heat-supplying element for keeping the upper part of the stone container relatively warm.

4. In a refrigerating cabinet, the combination of a container of stone, an expansion coil for keeping the lower part of the container cool, a heat supplying element for keeping the upper part of the stone container relatively warm, and an insulating bushing between the upper and lower portion of the stone container.

5. In a refrigerating cabinet, the combination of a stone container divided into an upper and lower zone by a bushing of insulating material, an expansion coil imbedded in the lower portion of the stone container, and means adjacent the upper portion of the stone container for furnishing heat thereto.

6. In a refrigerating cabinet, the combination of a stone container, an expansion coil molded into the lower portion of the container, an insulating bushing molded into the container near the top, a cover for the upper end of the container, and a heating element adjacent the cover and the upper end of the container for preventing ice from forming on the throat and the cover.

7. In a refrigerating cabinet, the combination of a container, a cover for the container, means for abstracting heat from the container and means for preventing the formation of ice between said cover and container.

In testimony whereof I have affixed my signature.

LLOYD G. COPEMAN.